US012319078B2

(12) United States Patent
Matsuba et al.

(10) Patent No.: US 12,319,078 B2
(45) Date of Patent: Jun. 3, 2025

(54) THERMAL TRANSFER SHEET, COMBINATION OF THERMAL TRANSFER SHEET AND INTERMEDIATE TRANSFER MEDIUM, AND METHOD FOR PRODUCING PRINTED MATERIAL

(71) Applicant: Dai Nippon Printing Co., Ltd., Tokyo (JP)

(72) Inventors: Emi Matsuba, Tokyo (JP); Hiroshi Eguchi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 474 days.

(21) Appl. No.: 17/753,063

(22) PCT Filed: Sep. 11, 2020

(86) PCT No.: PCT/JP2020/034536

§ 371 (c)(1),
(2) Date: Feb. 17, 2022

(87) PCT Pub. No.: WO2021/049632

PCT Pub. Date: Mar. 18, 2021

(65) Prior Publication Data

US 2022/0371350 A1 Nov. 24, 2022

(30) Foreign Application Priority Data

Sep. 11, 2019 (JP) ................................ 2019-165620

(51) Int. Cl.
*B41M 5/035* (2006.01)
*B41M 5/382* (2006.01)

(52) U.S. Cl.
CPC ........... *B41M 5/035* (2013.01); *B41M 5/382* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,932,325 A 8/1999 Ebihara et al.
2003/0137579 A1* 7/2003 Tamura .............. B41M 5/38207 347/217

(Continued)

FOREIGN PATENT DOCUMENTS

EP 1293355 A1 * 3/2003 ............ B41M 5/395
JP H09-039399 A 2/1997

(Continued)

OTHER PUBLICATIONS

English translation of International Preliminary Report on Patentability (Chapter I) (Application No. PCT/JP2020/034536) dated Mar. 24, 2022, 5 pages.
International Search Report and Written Opinion (Application No. PCT/JP2020/034536) dated Dec. 1, 2020 (with English translation).
Japanese Office Action (Application No. 2021-528831) dated Sep. 7, 2021 (with English translation).

(Continued)

*Primary Examiner* — Manish S Shah
(74) *Attorney, Agent, or Firm* — BURR PATENT LAW, PLLC

(57) ABSTRACT

A thermal transfer sheet according to the present disclosure includes a first substrate and a metallic luster layer containing a metal pigment, the metallic luster layer having a 45-degree specular gloss in the range of 30% to 80%.

9 Claims, 2 Drawing Sheets

(58) Field of Classification Search

CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2003/0138719 | A1* | 7/2003 | Aso | B41M 5/395 347/3 |
| 2003/0179274 | A1 | 9/2003 | Morizumi et al. | |
| 2005/0090394 | A1* | 4/2005 | Hirota | B41M 7/0027 503/201 |

FOREIGN PATENT DOCUMENTS

| | | | |
|---|---|---|---|
| JP | 2002-337468 | A | 11/2002 |
| JP | 2003-266956 | A | 9/2003 |
| JP | 2005-096357 | A | 4/2005 |
| JP | 2008-132773 | A | 6/2008 |
| JP | 2009-083146 | A | 4/2009 |
| JP | 2009-214339 | A | 9/2009 |
| JP | 2015-093387 | A | 5/2015 |
| KR | 10-2017-0001198 | A | 1/2017 |

OTHER PUBLICATIONS

Japanese Office Action (Application No. 2021-528831) dated Dec. 14, 2021 (with English translation).

Chinese Office Action (with English translation) dated Apr. 22, 2023 (Application No. 202080063292.7).

Chinese Office Action (Application No. 202080063292.7) dated Jul. 26, 2023 (with English translation) (15 pages).

Korean Office Action (with English translation) dated Apr. 25, 2024 (Application No. 10-2022-7011831).

Extended European Search Report dated Aug. 21, 2023 (Application No. 20862360.3).

* cited by examiner

THERMAL TRANSFER SHEET, COMBINATION OF THERMAL TRANSFER SHEET AND INTERMEDIATE TRANSFER MEDIUM, AND METHOD FOR PRODUCING PRINTED MATERIAL

TECHNICAL FIELD

The present disclosure relates to a thermal transfer sheet, a combination of a thermal transfer sheet and an intermediate transfer medium, and a method for producing a printed material.

BACKGROUND ART

Various thermal transfer recording methods have been known. In recent years, a sublimation thermal transfer system has been widely used which includes superimposing a thermal transfer sheet including a coloring layer containing a sublimation dye on a transfer-receiving article and then heating the thermal transfer sheet with a thermal head of a thermal transfer printer to transfer the sublimation dye from the coloring layer onto the transfer-receiving article, form an image, and produce a printed material.

Image formation by the sublimation thermal transfer system may be difficult on a transfer-receiving article with a certain surface profile or the like. In such a case, an intermediate transfer medium with a transfer layer including a receiving layer is used to form an image. For example, an image is formed by heating a thermal transfer sheet, transferring a sublimation dye in a coloring layer of the thermal transfer sheet to a receiving layer of an intermediate transfer medium to form an image, heating the intermediate transfer medium, and transferring a transfer layer onto a transfer-receiving article.

In recent years, a printed material produced by such a method is required to have a wide variety of design performances, for example, high gloss.

In Patent Literature 1, a printed material is produced by transferring a metallic luster layer of a thermal transfer sheet onto a transfer-receiving article and then melt-transferring a coloring layer onto the metallic luster layer. This improves the gloss of the printed material and provides a high-quality appearance.

CITATION LIST

Patent Literature

PTL 1: Japanese Unexamined Patent Application Publication No. 9-39399

SUMMARY OF INVENTION

Technical Problem

The present inventors found a new problem in known thermal transfer sheets with a metallic luster layer disclosed in Patent Literature 1 or the like that insufficient application of thermal energy to the metallic luster layer during transfer may cause cohesive failure in the metallic luster layer and result in poor transfer.

This is particularly problematic when a metallic luster layer is transferred onto a transfer layer of an intermediate transfer medium, and the transfer layer and the metallic luster layer are transferred onto a transfer-receiving article, because the transfer-receiving article and the transfer layer side of the intermediate transfer medium may face each other and may be thermally fused by heating, and a substrate of the intermediate transfer medium may be removed after the temperature of the substrate is decreased (cold peeling).

Transferability at low thermal energy for transfer or transferability in cold peeling is hereinafter referred to simply as transferability.

Accordingly, an object to be achieved by the present disclosure is to provide a thermal transfer sheet that includes a metallic luster layer with high transferability and can produce a glossy printed material.

Another object to be achieved by the present disclosure is to provide a combination of the thermal transfer sheet and an intermediate transfer medium and a method for producing a printed material using the combination.

Solution to Problem

The present inventors have extensively studied a method for solving the above problems. As a result, the present inventors have found that the transferability can be significantly improved while maintaining the high gloss of a metallic luster layer by setting the 45-degree specular gloss of the metallic luster layer in a specific numerical range.

A thermal transfer sheet according to the present disclosure includes a first substrate and a metallic luster layer containing a metal pigment, the metallic luster layer having a 45-degree specular gloss in the range of 30% to 80%.

A combination of a thermal transfer sheet and an intermediate transfer medium according to the present disclosure is characterized by including the thermal transfer sheet, and an intermediate transfer medium including a second substrate and a transfer layer.

A method for producing a printed material according to the present disclosure includes the steps of: providing the combination of the thermal transfer sheet and the intermediate transfer medium and a transfer-receiving article; transferring the metallic luster layer from the thermal transfer sheet onto the transfer layer of the intermediate transfer medium; and transferring the transfer layer of the intermediate transfer medium and the metallic luster layer located on the transfer layer onto the transfer-receiving article.

Advantageous Effects of Invention

The present disclosure can produce a glossy printed material including a metallic luster layer with high transferability. A thermal transfer sheet can be provided.

The present disclosure can also provide a combination of the thermal transfer sheet and an intermediate transfer medium and a method for producing a printed material using the combination.

DESCRIPTION OF EMBODIMENTS (Thermal Transfer Sheet)

Figure 1:
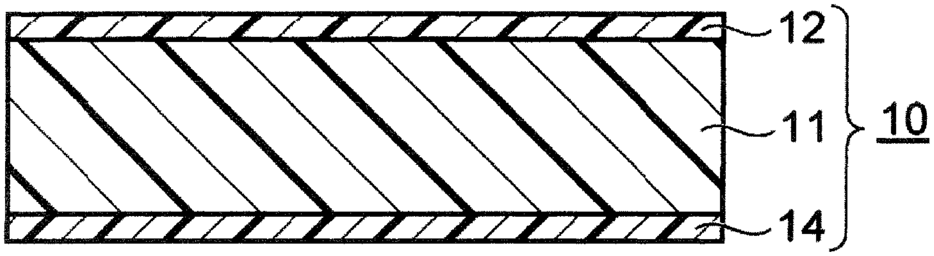
FIG. 1 is a schematic cross-sectional view of an embodiment of a thermal transfer sheet according to the present disclosure.

As illustrated in FIG. 1, a thermal transfer sheet 10 according to the present disclosure includes a first substrate 11 and a metallic luster layer 12.

Figure 2:
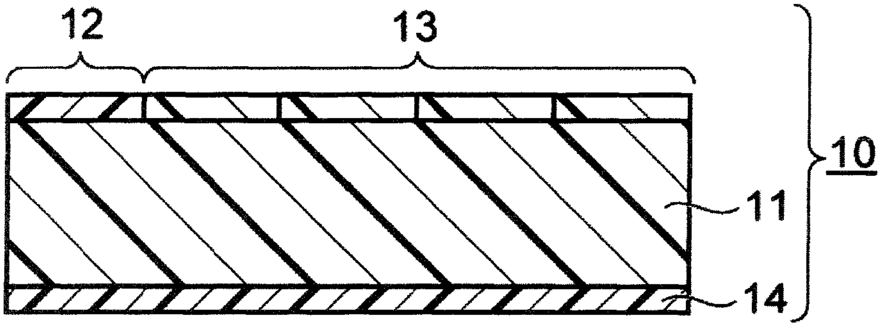
FIG. 2 is a schematic cross-sectional view of an embodiment of a thermal transfer sheet according to the present disclosure.

In one embodiment, as illustrated in FIG. 2, the thermal transfer sheet 10 further includes a coloring layer 13 on the first substrate 11 in a plane sequential manner with the metallic luster layer 12. As illustrated in FIG. 2, the thermal transfer sheet 10 may include a plurality of coloring layers 13.

In one embodiment, as illustrated in FIGS. 1 and 2, the thermal transfer sheet 10 includes a back layer 14 on the opposite surface of the first substrate 11 from the surface on which the metallic luster layer 12 is provided.

Each layer of the thermal transfer sheet according to the present disclosure is described below.

(First Substrate)

The first substrate may be any substrate that has heat resistance to withstand thermal energy applied during thermal transfer, mechanical strength to support a metallic luster layer and the like on the first substrate, and solvent resistance.

The first substrate may be a film comprising a resin (hereinafter referred to simply as a "resin film"). Examples of the resin include polyesters, such as poly(ethylene terephthalate) (PET), poly(butylene terephthalate) (PBT), poly (ethylene naphthalate) (PEN), 1,4-poly(cyclohexylenedimethylene terephthalate), and terephthalic acid-cyclohexanedimethanol-ethylene glycol copolymers; polyamides, such as nylon 6 and nylon 6,6; polyolefins, such as polyethylene (PE), polypropylene (PP) and polymethylpentene; vinyl resins, such as poly(vinyl chloride), poly (vinyl alcohol) (PVA), poly(vinyl acetate), vinyl chloride-vinyl acetate copolymers, poly(vinyl butyral), and polyvinylpyrrolidone (PVP); (meth)acrylic resins, such as poly(meth)acrylates and poly(methyl (meth)acrylate); imide resins, such as polyimides and polyetherimides; cellulose resins, such as cellophane, cellulose acetate, nitrocellulose, cellulose acetate propionate (CAP), and cellulose acetate butyrate (CAB); styrene resins, such as polystyrene (PS); polycarbonates; and ionomer resins.

Among these resins, in terms of heat resistance and mechanical strength, polyesters, such as PET and PEN, are preferred, and PET is particularly preferred.

In the present disclosure, "(meth)acrylic" includes both "acrylic" and "methacrylic", and "(meth)acrylate" includes both "acrylate" and "methacrylate".

The first substrate may be a laminate of the resin films. The laminate of the resin films can be formed by a dry lamination method, a wet lamination method, or an extrusion method.

When the first substrate is a resin film, the resin film may be a stretched film or an unstretched film. The resin film is preferably a uniaxially or biaxially stretched film in terms of strength.

The first substrate preferably has a thickness in the range of 2 to 25 μm, more preferably 3 to 16 μm. This can improve the mechanical strength of the first substrate and the transfer of thermal energy during thermal transfer.

(Metallic Luster Layer)

A metallic luster layer of the thermal transfer sheet according to the present disclosure has a 45-degree specular gloss in the range of 30% to 80%. This can improve the transferability of the metallic luster layer of the thermal transfer sheet and the gloss of a printed material produced using the thermal transfer sheet.

The 45-degree specular gloss of the metallic luster layer preferably ranges from 30% to 75%, more preferably 31% to 75%, still more preferably 32% to 75%.

In the present disclosure, the 45-degree specular gloss of the metallic luster layer is measured with a gloss meter in accordance with 45-degree Specular glossiness-Methods of measurement described in JIS Z 8741.

The 45-degree specular gloss can be adjusted, for example, by a content, an average particle size and surface smoothness of the metal pigment, and the thickness of the metallic luster layer. More specifically, the gloss tends to increase with the metal pigment content of the metallic luster layer, with the average particle size of the metal pigment, and with the surface smoothness of the metal pigment, and tends to decrease with the increasing thickness of the metallic luster layer.

In one embodiment, the metallic luster layer contains one or two or more metal pigments. Examples of the metal pigments include particles of aluminum, nickel, chromium, brass, tin, brass, bronze, zinc, silver, platinum, gold, and oxides thereof, and metal-evaporated glass. Among these, aluminum pigments are particularly preferred in terms of further improving the transferability of the metallic luster layer and the gloss of a printed material produced.

The aluminum pigments may be of a leafing type or a non-leafing type. Aluminum pigments of the non-leafing type are preferred in terms of further improving the transferability of the metallic luster layer and the gloss of a printed material produced.

The metal pigment preferably has an average particle size in the range of 4 to 10 μm, more preferably 6.5 to 9.5 μm. This can improve the thin line printability of the thermal transfer sheet. The average particle size refers to the median diameter (D50).

In the present disclosure, the average particle size of a metal pigment is measured in accordance with JIS Z 8825: 2013.

The metal pigment preferably has a hiding power of 2 or more, more preferably 2.5 or more, particularly preferably 4 or more. This can effectively hide and prevent the hue of the transfer-receiving article from affecting the hue of an image in a printed material. The metal pigment preferably has a hiding power of 6 or less, more preferably 5.5 or less.

In the present disclosure, the hiding power of a metal pigment is measured in accordance with JIS K 5600-4-1.

The metal pigment content of the metallic luster layer preferably ranges from 23% to 83% by mass, more preferably 33% to 67% by mass. This can further improve the transferability of the metallic luster layer and the gloss of a printed material produced using the thermal transfer sheet.

In one embodiment, the metallic luster layer contains one or two or more resin materials. Examples of the resin materials include polyesters, polyamides, polyolefins, vinyl resins, (meth)acrylic resins, cellulose resins, styrene resins, polycarbonates, and ionomer resins. Among these, in terms of further improving the transferability and thin line printability of the metallic luster layer, preferred are polyesters, vinyl resins (particularly vinyl chloride-vinyl acetate copolymers), and (meth)acrylic resins, and more preferred are vinyl resins and (meth)acrylic resins.

The resin material content of the metallic luster layer preferably ranges from 17% to 77% by mass, more preferably 33% to 67% by mass. This can further improve the transferability of the metallic luster layer.

The ratio of the metal pigment content to the resin material content (PV ratio=metal pigment content/resin material content) of the metallic luster layer preferably ranges from 0.3 to 5, more preferably 0.5 to 2, based on mass. This can further improve the transferability of the metallic luster layer and the gloss of a printed material produced using the thermal transfer sheet.

In one embodiment, the metallic luster layer contains one or two or more additive materials. Examples of the additive materials include fillers, plasticizing materials, antistatic materials, ultraviolet absorbing materials, inorganic particles, organic particles, release materials, and dispersing materials.

The metallic luster layer preferably has a thickness in the range of 0.1 to 7 μm, more preferably 0.2 to 4.5 μm. This can improve the thin line printability of the metallic luster layer.

The metallic luster layer can be formed, for example, by applying a coating liquid, which is prepared by dispersing or dissolving the above materials in water or an appropriate organic solvent, to the first substrate by known means to form a coating film and drying the coating film. The known means may be a roll coating method, a reverse roll coating method, a gravure coating method, a reverse gravure coating method, a bar coating method, or a rod coating method.

(Coloring Layer)

In one embodiment, the thermal transfer sheet further includes a coloring layer on the first substrate in a plane sequential manner with the metallic luster layer. The thermal transfer sheet may include a plurality of coloring layers.

The coloring layer may be a sublimation transfer coloring layer in which only a sublimation dye contained in the coloring layer is transferred or may be a melt transfer coloring layer in which the coloring layer itself is transferred.

In one embodiment, the thermal transfer sheet includes a sublimation transfer coloring layer, a white layer containing a white pigment, and a metallic luster layer on the first substrate in a plane sequential manner.

The coloring layer contains one or two or more coloring materials. The coloring material may be a pigment or a dye. The dye may also be a sublimation dye.

Examples of the coloring material include carbon black, acetylene black, lampblack, graphite, iron black, aniline black, silica, calcium carbonate, titanium oxide, cadmium red, cadmopone red, chromium red, vermilion, colcothar, azo pigments, alizarin lake, quinacridone, cochineal lake perylene, yellow ochre, aureolin, cadmium yellow, cadmium orange, chromium yellow, zinc yellow, Naples yellow, nickel yellow, azo pigments, greenish yellow, ultramarine, mountain blue, cobalt, phthalocyanine, anthraquinone, indigoid, cinnabar green, cadmium green, chromium green, phthalocyanine, azomethine, perylene, and aluminum pigments; and sublimation dyes, such as diarylmethane dyes, triarylmethane dyes, thiazole dyes, merocyanine dyes, pyrazolone dyes, methine dyes, indoaniline dyes, acetophenone azomethine dyes, pyrazoloazomethine dyes, xanthene dyes, oxazine dyes, thiazine dyes, azine dyes, acridine dyes, azo dyes, spiropyran dyes, indolinospiropyran dyes, fluoran dyes, naphthoquinone dyes, anthraquinone dyes, and quinophthalone dyes.

In one embodiment, the coloring layer contains one or two or more resin materials. Examples of the resin materials include polyesters, polyamides, polyolefins, vinyl resins, (meth)acrylic resins, cellulose resins, styrene resins, polycarbonates, butyral resins, phenoxy resins, and ionomer resins.

The coloring layer may contain one or two or more of the additive materials.

The coloring layer preferably has a thickness in the range of 0.1 to 3 μm.

The coloring layer can be formed, for example, by applying a coating liquid, which is prepared by dispersing or dissolving the above materials in water or an appropriate organic solvent, to the first substrate by the known means to form a coating film and drying the coating film.

(Back Layer)

In one embodiment, the thermal transfer sheet includes a back layer on the opposite surface of the first substrate from the surface on which the metallic luster layer is provided. This can improve the blocking resistance of the thermal transfer sheet.

In one embodiment, the back layer contains one or two or more resin materials. Examples of the resin material include cellulose resins, styrene resins, vinyl resins, polyesters, polyurethanes, silicone-modified polyurethanes, fluorine-modified polyurethanes, and (meth)acrylic resins.

In one embodiment, the back layer contains one or two or more types of inorganic or organic particles. This can further reduce the occurrence of sticking and wrinkling due to heating during thermal transfer.

Examples of the inorganic particles include inorganic particles of clay minerals, such as talc and kaolin, carbonates, such as calcium carbonate and magnesium carbonate, hydroxides, such as aluminum hydroxide and magnesium hydroxide, sulfates, such as calcium sulfate, oxides, such as silica, graphites, niter, and boron nitride.

Examples of the organic particles include organic resin particles comprising (meth)acrylic resins, Teflon (registered trademark) resins, silicone resins, lauroyl resins, phenolic resins, acetal resins, styrene resins, and polyamides, and cross-linked resin particles formed by reacting these resins with a cross-linking material.

The back layer may contain one or two or more of the additive materials.

The back layer preferably has a thickness in the range of 0.1 to 2 μm.

The back layer can be formed, for example, by applying a coating liquid, which is prepared by dispersing or dissolving the above materials in water or an appropriate organic solvent, to the first substrate by the known means to form a coating film and drying the coating film.

(Combination of Thermal Transfer Sheet and Intermediate Transfer Medium)

A combination of a thermal transfer sheet and an intermediate transfer medium according to the present disclosure includes the thermal transfer sheet, and an intermediate transfer medium including a second substrate and a transfer layer.

The thermal transfer sheet constituting the combination according to the present disclosure is described above and is not described here.

(Intermediate Transfer Medium)

Figure 3:
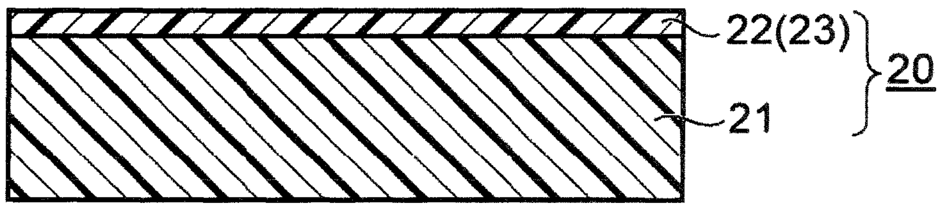
FIG. 3 is a schematic cross-sectional view of an embodiment of an intermediate transfer medium constituting a combination of a thermal transfer sheet and the intermediate transfer medium according to the present disclosure.

As illustrated in FIG. 3, an intermediate transfer medium 20 constituting the combination according to the present disclosure includes a second substrate 21 and a transfer layer 22.

Figure 4:
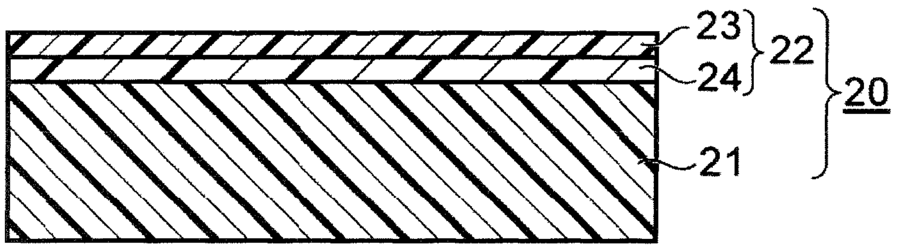
FIG. 4 is a schematic cross-sectional view of an embodiment of an intermediate transfer medium constituting a combination of a thermal transfer sheet and the intermediate transfer medium according to the present disclosure.

In one embodiment, the transfer layer 22 includes a receiving layer 23, as illustrated in FIG. 3. In one embodiment, the transfer layer 22 includes a peeling layer 24 between the second substrate 21 and the receiving layer 23, as illustrated in FIG. 4.

In one embodiment, the transfer layer 22 of the intermediate transfer medium 20 may include a protective layer (not shown in the figure) between the receiving layer 23 and the peeling layer 24. The intermediate transfer medium 20 may include a protective layer under the receiving layer 23 without the peeling layer 24.

(Second Substrate)

The second substrate may be a resin film, for example. Examples of a resin constituting the resin film include polyesters, such as PET, PBT, PEN, 1,4-poly(cyclohexylenedimethylene terephthalate), and terephthalic acid-cyclohexanedimethanol-ethylene glycol copolymers; polyamides, such as nylon 6 and nylon 6,6; polyolefins, such as PE, PP, and polymethylpentene; vinyl resins, such as poly (vinyl chloride), PVA, poly(vinyl acetate), vinyl chloride-vinyl acetate copolymers, poly(vinyl butyral), and PVP; (meth)acrylic resins, such as poly(meth)acrylates and poly (methyl (meth)acrylate); imide resins, such as polyimides and polyetherimides; cellulose resins, such as cellophane, cellulose acetate, nitrocellulose, CAP, and CAB; styrene resins, such as PS; polycarbonates; and ionomer resins.

In one embodiment, the second substrate may be the resin film with a roughened surface (hereinafter sometimes referred to as a roughened second substrate).

The transfer layer follows the rough surface of the substrate and is separated from the rough surface of the substrate when transferred and can therefore impart a matt feeling to a printed material thus produced. The matt feeling, which reduces the surface reflection of a printed material, can emphasize the gloss of the metallic luster layer behind the transferred transfer layer and can further improve the design performance of the printed material.

The roughened second substrate preferably has a haze in the range of 15% to 50%. This can impart a good matt feeling while maintaining the sharpness of a printed material produced and can further improve the design performance of the printed material.

In the present disclosure, the haze of the roughened second substrate is measured in accordance with JIS K 7136.

In one embodiment, one or two or more types of fillers in the resin film can roughen the surface of the second substrate. Examples of the fillers include inorganic particles, such as Syloid, Aerosil, zeolites, talc, and silica; and organic particles of dicarboxylic acid ester amides and polyethylene.

The filler content of the resin film preferably ranges from 5% to 30% by mass. This can provide the roughened second substrate with a good haze.

The roughened second substrate may be a commercial substrate and is preferably Emblet (registered trademark) PTH-12 (haze: 20%) or Emblet (registered trademark) PTHZ-12 (haze: 50%) manufactured by Unitika Ltd., for example.

The second substrate preferably has a thickness in the range of 1 to 50 μm, more preferably 6 to 25

(Receiving Layer)

In one embodiment, the receiving layer contains one or two or more resin materials. Examples of the resin materials include polyolefins, vinyl resins, such as poly(vinyl chloride) and vinyl chloride-vinyl acetate copolymers, (meth) acrylic resins, cellulose resins, polyesters, polyamides, polycarbonates, styrene resins, epoxy resins, polyurethanes, epoxy resins, and ionomer resins.

Among these, vinyl chloride-vinyl acetate copolymers and epoxy resins are preferred in terms of further improving the adhesion between the receiving layer and the metallic luster layer of the thermal transfer sheet.

The resin material content of the receiving layer preferably ranges from 80% to 98% by mass.

In one embodiment, the receiving layer contains one or two or more release materials. This can improve releasability from the thermal transfer sheet.

Examples of the release materials include solid waxes, such as polyethylene waxes, polyamide waxes, and Teflon (registered trademark) powders, fluorinated and phosphate surface-active materials, silicone oils, modified silicone oils, such as reactive silicone oils and curable silicone oils, and silicone resins.

The silicone oils may be oily silicone oils and are preferably modified silicone oils. The modified silicone oils are preferably amino-modified silicones, epoxy-modified silicones, aralkyl-modified silicones, epoxy-aralkyl-modified silicones, alcohol-modified silicones, vinyl-modified silicones, and urethane-modified silicones, particularly preferably epoxy-modified silicones, aralkyl-modified silicones, and epoxy-aralkyl-modified silicones.

The release material content of the receiving layer preferably ranges from 0.5% to 20% by mass, more preferably 0.5% to 10% by mass. This can further improve releasability between the receiving layer and the thermal transfer sheet.

The receiving layer may contain the additive materials.

The receiving layer preferably has a thickness in the range of 0.5 to 20 μm, more preferably 1 to 10 μM. This can improve the image density formed on the receiving layer.

The receiving layer can be formed, for example, by applying a coating liquid, which is prepared by dispersing or dissolving the above materials in water or an appropriate organic solvent, to the second substrate or a layer on the second substrate by the known means to form a coating film and drying the coating film.

(Peeling Layer)

In one embodiment, the transfer layer of the intermediate transfer medium includes a peeling layer under the receiving layer. This can improve the transferability of the transfer layer.

In one embodiment, the peeling layer contains one or two or more resin materials. Examples of the resin materials include (meth)acrylic resins, cellulose resins, vinyl resins, polyurethanes, silicone resins, polyesters, and fluororesins.

In one embodiment, the peeling layer contains one or two or more waxes. Examples of the waxes include natural waxes, such as beeswax, spermaceti, vegetable wax, rice bran wax, carnauba wax, candelilla wax, and montan wax; synthetic waxes, such as paraffin wax, microcrystalline wax, oxidized wax, ozokerite, ceresin, ester wax, and polyethylene wax; higher saturated fatty acids, such as margaric acid, lauric acid, myristic acid, palmitic acid, stearic acid, furoic acid, and behenic acid; higher saturated monohydric alcohols, such as stearyl alcohol and behenyl alcohol; higher esters, such as sorbitan fatty acid esters; and higher fatty acid amides, such as stearamide and oleamide.

The peeling layer may contain both the resin material(s) and wax(es) and may contain two or more of them.

The peeling layer preferably has a thickness in the range of 0.5 to 3 μm, more preferably 0.7 to 2 μm. This can further improve the transferability of the transfer layer.

The peeling layer can be formed, for example, by applying a coating liquid, which is prepared by dispersing or dissolving the above materials in water or an appropriate organic solvent, to the second substrate by the known means to form a coating film and drying the coating film.

(Protective Layer)

In one embodiment, the intermediate transfer medium includes a protective layer under the receiving layer.

In one embodiment, the protective layer contains one or two or more resin materials. Examples of the resin materials include polyesters, (meth)acrylic resins, epoxy resins, styrene resins, (meth)acrylic polyol resins, polyurethanes, ionizing radiation curable resins, and ultraviolet absorbing resins.

In one embodiment, the protective layer contains one or two or more isocyanate compounds. Examples of the isocyanate compounds include xylene diisocyanate, isophorone diisocyanate, and hexamethylene diisocyanate.

The protective layer may contain one or two or more of the additive materials.

The protective layer preferably has a thickness in the range of 0.5 to 7 μm, more preferably 1 to 5 μm. This can further improve the durability of the protective layer.

The protective layer can be formed, for example, by applying a coating liquid, which is prepared by dispersing or dissolving the above materials in water or an appropriate organic solvent, to the second substrate or a layer on the second substrate by the known means to form a coating film and drying the coating film.

(Method for Producing Printed Material)

A method for producing a printed material according to the present disclosure includes the steps of:

- providing the combination of the thermal transfer sheet and the intermediate transfer medium and a transfer-receiving article;
- transferring the metallic luster layer from the thermal transfer sheet onto the transfer layer of the intermediate transfer medium; and
- transferring the transfer layer of the intermediate transfer medium and the metallic luster layer located on the transfer layer onto the transfer-receiving article.

In one embodiment, the method for producing a printed material according to the present disclosure includes the step of forming an image on the receiving layer of the transfer layer of the intermediate transfer medium using the thermal transfer sheet before transferring the metallic luster layer.

Figure 5:
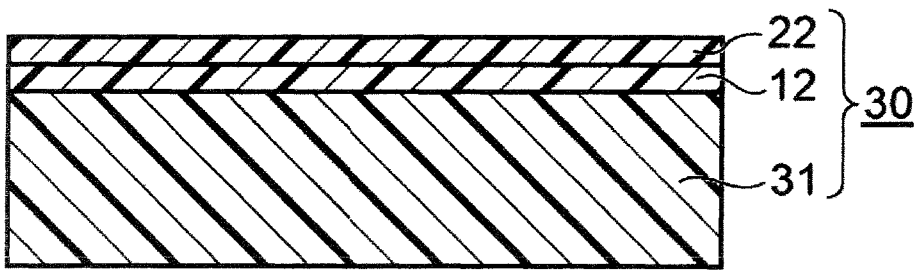
FIG. 5 is a schematic cross-sectional view of an embodiment of a printed material produced by a method for producing a printed material according to the present disclosure.

As illustrated in FIG. 5, a printed material 30 produced by the method for producing a printed material according to the present disclosure includes a transfer-receiving article 31, the metallic luster layer 12, and the transfer layer 22.

In the printed material 30, the metallic luster layer 12 and the transfer layer 22 may be provided over the entire surface of the transfer-receiving article 31 or on a portion of the surface of the transfer-receiving article 31.

The transfer-receiving article of the printed material may be a paper substrate, such as high-quality paper, art paper, coated paper, resin-coated paper, cast-coated paper, paperboard, synthetic paper, or impregnated paper, or a resin film as described for the first substrate.

The transfer-receiving article may be a laminate of these materials.

The transfer-receiving article preferably has a thickness in the range of 50 to 2000 μM.

The present disclosure relates to the following [1] to [11], for example.

[1] A thermal transfer sheet including: a first substrate and a metallic luster layer containing a metal pigment, the metallic luster layer having a 45-degree specular gloss in the range of 30% to 80%.

[2] The thermal transfer sheet according to [1], wherein the metal pigment has an average particle size in the range of 4 to 10 μm.

[3] The thermal transfer sheet according to [1] or [2], wherein the metallic luster layer contains a resin material, and the metallic luster layer has a ratio of a metal pigment content to a resin material content (metal pigment content/resin material content) in the range of 0.3 to 5.0 based on mass.

[4] The thermal transfer sheet according to [3], wherein the resin material is at least one resin material selected from polyesters, vinyl resins, and (meth)acrylic resins.

[5] The thermal transfer sheet according to any one of [1] to [4], wherein the metallic luster layer has a thickness in the range of 0.1 to 7 μm.

[6] The thermal transfer sheet according to any one of [1] to [5], wherein the metal pigment is an aluminum pigment.

[7] The thermal transfer sheet according to [6], wherein the aluminum pigment is of a non-leafing type.

[8] The thermal transfer sheet according to any one of [1] to [7], wherein the metal pigment has a hiding power of 2.5 or more.

[9] The thermal transfer sheet according to any one of [1] to [8], further including a coloring layer on the first substrate in a plane sequential manner with the metallic luster layer.

[10] A combination of the thermal transfer sheet according to any one of [1] to [9] and an intermediate transfer medium, wherein the intermediate transfer medium includes a second substrate and a transfer layer.

[11] A method for producing a printed material, including the steps of: providing the combination of the thermal transfer sheet and the intermediate transfer medium according to [10] and a transfer-receiving article; transferring the metallic luster layer from the thermal transfer sheet onto the transfer layer of the intermediate transfer medium; and transferring the transfer layer of the intermediate transfer medium and the metallic luster layer located on the transfer layer onto the transfer-receiving article.

EXAMPLES

Although the present disclosure is further described in the following examples, the present disclosure is not limited to these examples. Unless otherwise specified, the content, the blend ratio, and the like are based on mass.

Production of Thermal Transfer Sheet

Example 1

A PET film with a thickness of 4.5 μm (Lumirror (registered trademark) manufactured by Toray Industries, Inc.) was provided as the first substrate. Coating liquids A, B, C and D with the following compositions for forming a coloring layer were applied to one surface of the PET film in a plane sequential manner and were dried to form coloring layers A to D each with a thickness of 0.7 μm.

<Coating Liquid A for Forming Coloring Layer>

| | |
|---|---|
| Yellow sublimation dye | 5 parts by mass |
| Poly(vinyl acetal) | 5 parts by mass |
| Methyl ethyl ketone (MEK) | 90 parts by mass |

<Coating Liquid B for Forming Coloring Layer>

| | |
|---|---|
| Magenta sublimation dye | 5 parts by mass |
| Poly(vinyl acetal) | 5 parts by mass |
| MEK | 90 parts by mass |

<Coating Liquid C for Forming Coloring Layer>

| | |
|---|---|
| Cyan sublimation dye | 5 parts by mass |
| Poly(vinyl acetal) | 5 parts by mass |
| MEK | 90 parts by mass |

<Coating Liquid D for Forming Coloring Layer>

| | |
|---|---|
| Carbon black | 5 parts by mass |
| Vinyl chloride-vinyl acetate copolymer | 5 parts by mass |
| MEK | 90 parts by mass |

A coating liquid with the following composition for forming a metallic luster layer was applied in a plane sequential manner with the coloring layer and was dried to form a metallic luster layer with a thickness of 2 μm. The 45-degree specular gloss of the metallic luster layer was 46.6% as measured with a gloss meter (VG 7000 manufactured by Nippon Denshoku Industries Co., Ltd.) in accordance with the 45-degree Specular glossiness-Methods of measurement described in JIS Z 8741.

Also in the following examples and comparative examples, the 45-degree specular gloss of the metallic luster layer was measured in the same manner as in Example 1. Tables 1 and 2 show the measurement results.

<Coating Liquid for Forming Metallic Luster Layer>

| | |
|---|---|
| Aluminum pigment A (FD-5060 manufactured by Asahi Kasei Corporation, average particle size: 6 μm, hiding power: 3.4, non-leafing type) | 20 parts by mass |
| Vinyl chloride-vinyl acetate copolymer (Solbin (registered trademark) CNL manufactured by Nissin Chemical Industry Co., Ltd.) | 20 parts by mass |
| MEK | 30 parts by mass |
| Toluene | 30 parts by mass |

A coating liquid with the following composition for forming a back layer was applied to the other surface of the first substrate and was dried to form a back layer with a thickens of 0.1 μm. Thus, a thermal transfer sheet was formed.

Coating Liquid for Forming Back Layer

| | |
|---|---|
| Poly(vinyl butyral) (S-Lec (registered trademark) BX-1 manufactured by Sekisui Chemical Co., Ltd.) | 2 parts by mass |
| Polyisocyanate (Burnock (registered trademark) D750 manufactured by DIC Corporation) | 9.2 parts by mass |
| Phosphate surfactant (Dai-ichi Kogyo Seiyaku Co., Ltd., Plysurf (registered trademark) A208N) | 1.3 parts by mass |
| Talc (Nippon Talc Co., Ltd., Micro Ace (registered trademark) P-3) | 0.3 parts by mass |
| Toluene | 43.6 parts by mass |
| MEK | 43.6 parts by mass |

Examples 2 to 16 and Comparative Examples 1 to 11

A thermal transfer sheet was obtained in the same manner as in Example 1 except that the composition of the metallic luster layer was changed as shown in Tables 1 and 2.

The components in Tables 1 and 2 are described in detail below. In Tables 1 and 2, an aluminum pigment is referred to as "Al pigment".

- Aluminum pigment A: FD-5060 manufactured by Asahi Kasei Corporation, average particle size: 6 μm, hiding power: 3.4, non-leafing type
- Aluminum pigment B: AM-1501 manufactured by Asahi Kasei Corporation, average particle size: 8 μm, hiding power: 5.0, non-leafing type
- Aluminum pigment C: S-8801T manufactured by Asahi Kasei Corporation, average particle size: 15 μm, hiding power: 2.4, non-leafing type
- Aluminum pigment D: BS-120 manufactured by Asahi Kasei Corporation, average particle size: 13 μm, hiding power: 3.7, non-leafing type
- Aluminum pigment E: FD-508H manufactured by Asahi Kasei Corporation, average particle size: 8 μm, hiding power: 4.8, non-leafing type
- Aluminum pigment F: 8NL-S manufactured by Asahi Kasei Corporation, average particle size: 8 μm, hiding power: 2.3, non-leafing type
- Aluminum pigment G: 2173 manufactured by Toyo Aluminium K.K., average particle size: 11 μm, non-leafing type Vinyl chloride-vinyl acetate copolymer: Solbin (registered trademark) CNL manufactured by Nissin Chemical Industry Co., Ltd.
- (Meth)acrylic resin: Dianal (registered trademark) BR-87 manufactured by Mitsubishi Chemical Corporation
- Polyester: Elitel (registered trademark) UE3200 manufactured by Unitika Ltd.

(Production of Intermediate Transfer Medium A)

A PET film with a thickness of 12 μm (Lumirror (registered trademark) manufactured by Toray Industries, Inc.) was provided as the second substrate. A coating liquid with the following composition for forming a peeling layer was applied to one surface of the PET film and was dried to form a peeling layer with a thickness of 1 μm.

<Coating Liquid for Forming Peeling Layer>

| | |
|---|---|
| (Meth)acrylic resin (Dianal (registered trademark) BR-87 manufactured by Mitsubishi Chemical Corporation) | 9.5 parts by mass |
| Polyester (Vylon (registered trademark) 200 manufactured by Toyobo Co., Ltd.) | 0.5 parts by mass |
| Toluene | 20 parts by mass |
| MEK | 20 parts by mass |

A coating liquid with the following composition for forming a protective layer was applied to the peeling layer thus formed and was dried to form a protective layer with a thickness of 2 μm.

<Coating Liquid for Forming Protective Layer>

| | |
|---|---|
| (Meth)acrylic polyol resin (6KW-700 manufactured by Taisei Fine Chemical Co., Ltd., solid content: 36.5%, Tg: 102° C., Mw: 55000, hydroxyl value: 30.1) | 100 parts by mass |
| Isocyanate compound (Takenate (registered trademark:) D110N manufactured by Mitsui Chemicals, Inc., solid content: 75%) | 3.6 parts by mass |
| MEK | 92 parts by mass |

A coating liquid with the following composition for forming a receiving layer was applied to the protective layer thus formed and was dried to form a receiving layer with a thickness of 2 μm. Thus, an intermediate transfer medium A was obtained.

<Coating Liquid for Forming Receiving Layer>

| | |
|---|---|
| Vinyl chloride-vinyl acetate copolymer (Solbin (registered trademark) CNL manufactured by Nissin Chemical Industry Co., Ltd.) | 95 parts by mass |
| Epoxy-modified silicone oil (KP-1800U manufactured by Shin-Etsu Chemical Co., Ltd.) | 5 parts by mass |
| Toluene | 200 parts by mass |
| MEK | 200 parts by mass |

(Production of Intermediate Transfer Medium B)

An intermediate transfer medium B was obtained in the same manner as described above except that the second substrate was changed to a roughened second substrate (Emblet (registered trademark) PTH-12 manufactured by Unitika Ltd.)

<Evaluation of Transferability>

The sublimation dye was sublimated and transferred from the coloring layers A to C of the thermal transfer sheets according to the examples and comparative examples onto the receiving layer of the intermediate transfer media A and B thus obtained (hereinafter collectively referred to as the intermediate transfer medium) using the following printer at an energy gradation of 128/255 to form a gray image. The metallic luster layer was then transferred onto the receiving layer on which the image was formed.

(Printer)

HDP5000 (manufactured by FARGO)

Retransfer temperature: 175° C.

Retransfer speed: 2.3 seconds/inch

A PVC card was provided as a transfer-receiving article. The laminate of the peeling layer, the protective layer, the receiving layer, and the metallic luster layer was transferred with the printer from the intermediate transfer medium onto one entire side of the PVC card to produce a printed material.

The transfer was performed by thermally fusing the PVC card and the intermediate transfer medium, lowering the temperature of the intermediate transfer medium, and then separating the second substrate.

The transferability of the metallic luster layer to the PVC card was evaluated on the basis of the following evaluation criteria by visually examining the transfer area of the metallic luster layer, the receiving layer, the protective layer, and the peeling layer. Tables 1 and 2 show the evaluation results.

(Evaluation Criteria)

A: The transfer area of the metallic luster layer, the receiving layer, the protective layer, and the peeling layer was 95% or more of the area of the PVC card.

B: The transfer area of the metallic luster layer, the receiving layer, the protective layer, and the peeling layer was 70% or more and less than 95% of the area of the PVC card.

NG: The transfer area of the metallic luster layer, the receiving layer, the protective layer, and the peeling layer was less than 70% of the area of the PVC card, and cohesive failure was observed in the metallic luster layer.

<Evaluation of Design Performance (Gloss)>

The printed material produced for the evaluation of transferability was visually observed and was evaluated on the basis of the following evaluation criteria. Tables 1 and 2 show the evaluation results.

Evaluation Criteria

A: The printed material had a very high gloss and high design performance.

B: The printed material had a high gloss.

C: The printed material had a gloss.

NG: The printed material had a low gloss and had room for improvement in design performance.

<Evaluation of Thin Line Printability>

The metallic luster layer was transferred onto the receiving layer of the intermediate transfer medium on which an image was formed in the evaluation of transferability to form a one-dot thin line.

The transfer was performed to form a two-dot thin line and a three-dot thin line.

The metallic luster layer after the transfer was visually observed and was evaluated on the basis of the following evaluation criteria. Tables 1 and 2 show the evaluation results.

Evaluation Criteria

A: No collapsed or faint lines were observed in any of the one-dot, two-dot, and three-dot thin lines.

B: Although no collapsed or faint lines were observed in the two-dot and three-dot thin lines, collapsed and faint lines were observed in the one-dot thin lines.

C: Although no collapsed or faint lines were observed in the three-dot thin lines, collapsed and faint lines were observed in the one-dot and two-dot thin lines.

D: Collapsed and faint lines were observed in the one-dot, two-dot, and three-dot thin lines.

TABLE 1

| | Type of metal pigment | Average particle size of metal pigment (μm) | Metal pigment content (mass %) | Type of resin material | Resin material content (mass %) | PV ratio | Thickness of metallic luster layer (μm) | 45-degree specular gloss (%) |
|---|---|---|---|---|---|---|---|---|
| Ex. 1 | Al pigment A | 6 | 50% | Vinyl chloride-vinyl acetate copolymer | 50% | 1 | 2 | 46.6 |

TABLE 1-continued

| | | | | | | | | |
|---|---|---|---|---|---|---|---|---|
| Ex. 2 | Al pigment B | 8 | 33% | Vinyl chloride-vinyl acetate copolymer | 67% | 0.5 | 0.5 | 62.5 |
| Ex. 3 | Al pigment B | 8 | 33% | Vinyl chloride-vinyl acetate copolymer | 67% | 0.5 | 2 | 41.5 |
| Ex. 4 | Al pigment B | 8 | 33% | Vinyl chloride-vinyl acetate copolymer | 67% | 0.5 | 5 | 32.9 |
| Ex. 5 | Al pigment B | 8 | 50% | Vinyl chloride-vinyl acetate copolymer | 50% | 1 | 5 | 38.7 |
| Ex. 6 | Al pigment B | 8 | 50% | Vinyl chloride-vinyl acetate copolymer | 50% | 1 | 2 | 45.2 |
| Ex. 7 | Al pigment B | 8 | 50% | Vinyl chloride-vinyl acetate copolymer | 50% | 1 | 0.5 | 73.8 |
| Ex. 8 | Al pigment B | 8 | 50% | (Meth)acrylic resin | 50% | 1 | 5 | 38.7 |
| Ex. 9 | Al pigment B | 8 | 50% | (Meth)acrylic resin | 50% | 1 | 2 | 45.2 |
| Ex. 10 | Al pigment B | 8 | 50% | (Meth)acrylic resin | 50% | 1 | 0.5 | 73.8 |
| Ex. 11 | Al pigment B | 8 | 50% | Polyester | 50% | 1 | 5 | 38.7 |
| Ex. 12 | Al pigment B | 8 | 50% | Polyester | 50% | 1 | 2 | 45.2 |
| Ex. 13 | Al pigment B | 8 | 50% | Polyester | 50% | 1 | 0.5 | 73.8 |
| Ex. 14 | Al pigment C | 15 | 50% | Vinyl chloride-vinyl acetate copolymer | 50% | 1 | 2 | 75.2 |
| Ex. 15 | Al pigment D | 13 | 50% | Vinyl chloride-vinyl acetate copolymer | 50% | 1 | 2 | 66.1 |
| Ex. 16 | Al pigment E | 8 | 33% | Vinyl chloride-vinyl acetate copolymer | 67% | 0.5 | 2 | 71.2 |

| | Use of intermediate transfer medium A | | | Use of intermediate transfer medium B | | |
|---|---|---|---|---|---|---|
| | Evaluation of transferability | Evaluation of design performance | Evaluation of thin line printability | Evaluation of transferability | Evaluation of design performance | Evaluation of thin line printability |
| Ex. 1 | A | C | B | A | C | B |
| Ex. 2 | A | B | A | A | B | A |
| Ex. 3 | A | B | A | A | B | A |
| Ex. 4 | A | B | B | A | B | B |
| Ex. 5 | A | B | B | A | B | B |
| Ex. 6 | A | B | A | A | B | A |
| Ex. 7 | A | B | A | A | B | A |
| Ex. 8 | A | B | B | A | B | B |
| Ex. 9 | A | B | A | A | B | A |
| Ex. 10 | A | B | A | A | B | A |
| Ex. 11 | A | B | C | A | B | C |
| Ex. 12 | A | B | C | A | B | C |
| Ex. 13 | A | B | B | A | B | B |
| Ex. 14 | B | B | B | B | B | B |
| Ex. 15 | B | B | B | B | B | B |
| Ex. 16 | B | B | B | B | B | B |

TABLE 2

| | Type of metal pigment | Average particle size of metal pigment (μm) | Metal pigment content (mass %) | Type of resin material | Resin material content (mass %) | PV ratio | Thickness of metallic luster layer (μm) | 45-degree specular gloss (%) |
|---|---|---|---|---|---|---|---|---|
| Com. Ex. 1 | Al pigment E | 8 | 33% | Vinyl chloride-vinyl acetate copolymer | 67% | 0.5 | 0.5 | 141.4 |
| Com. Ex. 2 | Al pigment E | 8 | 50% | Vinyl chloride-vinyl acetate copolymer | 50% | 1 | 0.5 | 135.3 |
| Com. Ex. 3 | Al pigment E | 8 | 50% | Vinyl chloride-vinyl acetate copolymer | 50% | 1 | 2 | 85.5 |
| Com. Ex. 4 | Al pigment E | 8 | 50% | (Meth)acrylic resin | 50% | 1 | 0.5 | 135.3 |
| Com. Ex. 5 | Al pigment E | 8 | 50% | (Meth)acrylic resin | 50% | 1 | 2 | 85.5 |
| Com. Ex. 6 | Al pigment E | 8 | 50% | Polyester | 50% | 1 | 0.5 | 135.3 |
| Com. Ex. 7 | Al pigment E | 8 | 50% | Polyester | 50% | 1 | 2 | 85.5 |
| Com. Ex. 8 | Al pigment E | 8 | 67% | Vinyl chloride-vinyl acetate copolymer | 33% | 2 | 0.5 | 124.5 |

TABLE 2-continued

| | | | | | | | | |
|---|---|---|---|---|---|---|---|---|
| Com. Ex. 9 | Al pigment E | 8 | 67% | Vinyl chloride-vinyl acetate copolymer | 33% | 2 | 2 | 84.5 |
| Com. Ex. 10 | Al pigment F | 8 | 50% | Vinyl chloride-vinyl acetate copolymer | 50% | 1 | 2 | 26.4 |
| Com. Ex. 11 | Al pigment G | 11 | 50% | Vinyl chloride-vinyl acetate copolymer | 50% | 1 | 2 | 28.6 |

| | Use of intermediate transfer medium A | | | Use of intermediate transfer medium B | | |
|---|---|---|---|---|---|---|
| | Evaluation of transferability | Evaluation of design performance | Evaluation of thin line printability | Evaluation of transferability | Evaluation of design performance | Evaluation of thin line printabilitv |
| Com. Ex. 1 | NG | B | B | NG | B | B |
| Com. Ex. 2 | NG | B | B | NG | B | B |
| Com. Ex. 3 | NG | A | B | NG | A | B |
| Com. Ex. 4 | NG | B | A | NG | B | A |
| Com. Ex. 5 | NG | A | A | NG | A | A |
| Com. Ex. 6 | NG | B | C | NG | B | C |
| Com. Ex. 7 | NG | A | D | NG | A | D |
| Com. Ex. 8 | NG | B | B | NG | B | B |
| Com. Ex. 9 | NG | A | B | NG | A | B |
| Com. Ex. 10 | A | NG | B | A | NG | B |
| Com. Ex. 11 | A | NG | B | A | NG | B |

Those skilled in the art will appreciate that a thermal transfer sheet and the like according to the present disclosure are not limited to these examples, that the examples and the specification only illustrate the principles of the present disclosure, that various modifications and improvements may be made without departing from the gist and scope of the present disclosure, and that all the modifications and improvements fall within the scope of the present disclosure for which protection is sought. Furthermore, the scope for which protection is sought by the present disclosure includes not only the claims but also equivalents thereof.

REFERENCE SIGNS LIST

10 thermal transfer sheet
11 first substrate
12 metallic luster layer
13 coloring layer
14 back layer
20 intermediate transfer medium
21 second substrate
22 transfer layer
23 receiving layer
24 peeling layer
30 printed material
31 transfer-receiving article

The invention claimed is:

1. A combination of a thermal transfer sheet and an intermediate transfer medium comprising:

a thermal transfer sheet comprising a first substrate and a metallic luster layer containing a metal pigment and a resin material, wherein the resin material is at least one resin material selected from the group consisting of polyesters, vinyl resins, and (meth)acrylic resins, and wherein the metallic luster layer has a 45-degree specular gloss, measured with a gloss meter in accordance with 45-degree specular glossiness-methods of measurement described in JIS Z 8741, in a range of 30% to 80%; and an intermediate transfer medium, comprising a second substrate and a transfer layer containing a receiving layer, wherein the receiving layer contains at least one resin material selected from the group consisting of vinyl chloride-vinyl acetate copolymers and epoxy resins, and wherein the second substrate has a haze, measured in accordance with JIS K 7136, in a range of 15% to 50%.

2. A method for producing a printed material, comprising the steps of:

providing the combination of the thermal transfer sheet and the intermediate transfer medium according to claim 1 and a transfer-receiving article;

transferring the metallic luster layer from the thermal transfer sheet onto the transfer layer of the intermediate transfer medium; and transferring the transfer layer of the intermediate transfer medium and the metallic luster layer located on the transfer layer onto the transfer-receiving article.

3. The combination of a thermal transfer sheet and an intermediate transfer medium according to claim 1, wherein the metal pigment has an average particle size, measured in accordance with JIS Z 8825 2013, in a range of 4 to 10 μm.

4. The combination of a thermal transfer sheet and an intermediate transfer medium according to claim 1, wherein in the metallic luster layer, a ratio of a metal pigment content to a resin material content (metal pigment content/resin material content) is in a range of 0.3 to 5.0, based on mass.

5. The combination of a thermal transfer sheet and an intermediate transfer medium according to claim 1, wherein the metallic luster layer has a thickness in a range of 0.1 to 7 μm.

6. The combination of a thermal transfer sheet and an intermediate transfer medium according to claim 1, wherein the metal pigment is an aluminum pigment.

7. The combination of a thermal transfer sheet and an intermediate transfer medium according to claim 6, wherein the aluminum pigment is a non-leafing pigment.

8. The combination of a thermal transfer sheet and an intermediate transfer medium according to claim 1, wherein the metal pigment has a hiding power, measured in accordance with JIS K 5600-4-1, of 2.5 or more.

9. The combination of a thermal transfer sheet and an intermediate transfer medium according to claim 1, further comprising a coloring layer arranged on the first substrate in a plane sequential manner with the metallic luster layer.

* * * * *